United States Patent
Komatsu et al.

(10) Patent No.: US 12,335,599 B2
(45) Date of Patent: Jun. 17, 2025

(54) IMAGE PROCESSING DEVICE, IMAGE PROCESSING METHOD, IMAGING DEVICE, AND RECORDING MEDIUM THAT DISPLAY FIRST AND SECOND SUBJECT REGIONS IN A CAPTURED IMAGE

(71) Applicant: CANON KABUSHIKI KAISHA, Tokyo (JP)

(72) Inventors: Satoru Komatsu, Kanagawa (JP); Akinari Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/693,834

(22) PCT Filed: Sep. 3, 2020

(86) PCT No.: PCT/JP2020/033454
§ 371 (c)(1),
(2) Date: Mar. 14, 2022

(87) PCT Pub. No.: WO2021/054140
PCT Pub. Date: Mar. 25, 2021

(65) Prior Publication Data
US 2024/0214668 A1    Jun. 27, 2024

(30) Foreign Application Priority Data
Sep. 20, 2019  (JP) .................................. 2019-171632

(51) Int. Cl.
*H04N 23/63* (2023.01)
*G01B 11/02* (2006.01)
(Continued)

(52) U.S. Cl.
CPC ............. *H04N 23/63* (2023.01); *G01B 11/02* (2013.01); *G06T 1/0007* (2013.01); *G06T 5/80* (2024.01);
(Continued)

(58) Field of Classification Search
CPC ........ H04N 23/00; H04N 23/53; H04N 23/54; H04N 23/55; H04N 23/60–62;
(Continued)

(56) References Cited

U.S. PATENT DOCUMENTS 9,508,153 B2   11/2016   Komatsu
9,576,370 B2   2/2017   Komatsu et al.
(Continued)

FOREIGN PATENT DOCUMENTS

CN   102278946 A   12/2011
CN   104883560 A   9/2015
(Continued)

OTHER PUBLICATIONS

Japanese Office Action issued on Oct. 31, 2023, in corresponding Japanese Patent Application No. 2019-171632, with English translation (6 pages).
(Continued)

*Primary Examiner* — Twyler L Haskins
*Assistant Examiner* — Ashkay Trehan
(74) *Attorney, Agent, or Firm* — Venable LLP

(57) ABSTRACT

An image processing device including at least one processor and/or a circuit to function as an acquisition unit to acquire an image captured by an imaging element and information related to a distance distribution in a depth direction corresponding to the captured image, and a control unit to control display of the captured image. The control unit performs control so a first subject region in the captured image corresponding to a subject within a distance range in which
(Continued)

a distance is measurable with a measurement accuracy equal to or higher than a reference, and a second subject region in the captured image corresponding to a subject not within the distance range are displayed so as to be distinguished from each other, from a reference distance in the depth direction. A distance that is a target of the distance measurement is a distance corresponding to measurement points designated in the image.

40 Claims, 10 Drawing Sheets

(51) Int. Cl.
| | | |
|---|---|---|
| *G06T 1/00* | (2006.01) | |
| *G06T 5/80* | (2024.01) | |
| *G06T 7/00* | (2017.01) | |
| *G06T 7/13* | (2017.01) | |
| *G06T 7/50* | (2017.01) | |
| *G06T 7/62* | (2017.01) | |
| *H04N 23/54* | (2023.01) | |
| *H04N 23/55* | (2023.01) | |
| *H04N 23/60* | (2023.01) | |
| *H04N 23/67* | (2023.01) | |

(52) U.S. Cl.
CPC ............... *G06T 7/00* (2013.01); *G06T 7/13* (2017.01); *G06T 7/50* (2017.01); *G06T 7/62* (2017.01); *H04N 23/54* (2023.01); *H04N 23/55* (2023.01); *H04N 23/60* (2023.01); *H04N 23/675* (2023.01); *G06T 2207/10028* (2013.01)

(58) Field of Classification Search
CPC .... H04N 23/63; H04N 23/631; H04N 23/632; H04N 23/633; H04N 23/634; H04N 23/635; H04N 23/64; H04N 23/675; H04N 23/957; H04N 23/958; H04N 23/959; H04N 1/00408; H04N 1/00411; H04N 1/00413; G06T 1/00; G06T 1/0007; G06T 5/80; G06T 7/00; G06T 7/13; G06T 7/50; G01B 11/02; G01B 11/026; G06F 1/1692; G06F 3/0416; G06F 3/048; G06F 3/0482; G06F 3/0488; G06F 3/04886

See application file for complete search history.

(56) References Cited

U.S. PATENT DOCUMENTS

| | | |
|---|---|---|
| 9,762,788 B2 | 9/2017 | Komatsu |
| 9,846,944 B2 | 12/2017 | Ishihara |
| 9,928,598 B2 | 3/2018 | Komatsu |
| 10,101,156 B2 | 10/2018 | Li et al. |
| 2010/0157127 A1 | 6/2010 | Wataru |
| 2011/0249117 A1* | 10/2011 | Yoshihama ............... G06T 7/62 |
| | | 348/135 |
| 2014/0210999 A1 | 7/2014 | Komatsu et al. |
| 2015/0042839 A1 | 2/2015 | Komatsu et al. |
| 2015/0043783 A1* | 2/2015 | Ishihara .................. G06T 7/571 |
| | | 382/106 |
| 2016/0080727 A1 | 3/2016 | Komatsu |
| 2019/0096079 A1* | 3/2019 | Ishibashi .............. H04N 13/239 |

FOREIGN PATENT DOCUMENTS

| | | | |
|---|---|---|---|
| JP | H01134320 A | 5/1989 | |
| JP | 2000-047315 A | 2/2000 | |
| JP | 2006-311505 A | 11/2006 | |
| JP | 2011232330 A | 11/2011 | |
| JP | 2016001853 A | 1/2016 | |
| JP | 2017-49152 A | 3/2017 | |
| JP | 2017049152 A * | 3/2017 | ............ G01C 11/04 |
| JP | 6392991 B2 | 9/2018 | |
| JP | 2015-34732 A | 2/2019 | |
| JP | 2019-66451 A | 4/2019 | |

OTHER PUBLICATIONS

Chinese Office Action issued Jul. 15, 2024, in corresponding Chinese Application No. 202080065830.6, with English translation (28 pages).
Notice of Registration, Notice of Grant of Patent Right, and Search Report issued Dec. 1, 2024, in corresponding Chinese Patent Application No. 202080065830.6, with English Translation (12 pages).

* cited by examiner

IMAGE PROCESSING DEVICE, IMAGE PROCESSING METHOD, IMAGING DEVICE, AND RECORDING MEDIUM THAT DISPLAY FIRST AND SECOND SUBJECT REGIONS IN A CAPTURED IMAGE

CROSS-REFERENCE TO RELATED APPLICATIONS

This application is a continuation of International Patent Application No. PCT/JP2020/33454, filed Sep. 3, 2020, which claims the benefit of Japanese Patent Application No. 2019-171632, filed Sep. 20, 2019, both of which are hereby incorporated by reference herein in their entirety.

BACKGROUND OF THE INVENTION

Field of the Invention

The present invention relates to a technique for measuring a distance between a plurality of measurement points designated in an image and highlighting a specific region.

Background Art

There is a technique for measuring dimensions between measurement points in an image designated by a user. For example, in a technique of measuring a dimension of a subject region in an image, when a plurality of dimension measurement points is designated on the subject region, a process of measuring a dimension between the dimension measurement points is performed and a measurement result is displayed.

Japanese Patent No. 6392991 discloses a method, an apparatus, and a terminal device for specifying spatial parameters from images. A method has been proposed in which edge detection is performed on an image to specify whether or not a specified dimension measurement position is an edge corresponding to both ends of a subject, in order to provide a notification of whether or not to adjust the measurement position.

In the technique disclosed in Japanese Patent No. 6392991, a case when distances in a depth direction from an imaging device to both ends of a subject are different is not taken into consideration. In a case when an image is acquired by a normal imaging device, central projection is performed, and an imaging magnification differs depending on a distance in a depth direction of an image. Thus, a size of a subject in a captured image differs between a front side (e.g., an imaging device side) position and a depth side position. If a dimension between edges at both ends of the subject is measured under such imaging conditions, there is a problem in that a correct dimension of the subject cannot be obtained.

SUMMARY OF THE INVENTION

An object of the present invention is to provide an image processing device that displays a region in which a distance corresponding to a plurality of measurement points designated in a subject region of an image is measurable on the basis of measurement accuracy.

According to an embodiment, the present invention provides an image processing device including an acquisition unit configured to acquire an image and information related to a distance distribution in a depth direction corresponding to the image, and a control unit configured to control display of the image, in which the control unit performs control such that a subject region in the image corresponding to a subject within a distance range in which a distance is measurable with a measurement accuracy higher than a reference from a reference distance in the depth direction is displayed to be identifiable.

According to the image processing device of the present invention, it is possible to provide an image processing device that displays a region in which a distance corresponding to a plurality of measurement points designated in a subject region of an image is measurable on the basis of measurement accuracy.

Further features of the present invention will become apparent from the following description of exemplary embodiments with reference to the attached drawings.

DESCRIPTION OF THE EMBODIMENTS

Hereafter, embodiments of the present invention will be described in detail with reference to the accompanying drawings. In the embodiments, an example of an application to a digital camera capable of acquiring depth information related to a distance distribution of a subject as an image processing device will be described. The present invention is applicable to any device capable of calculating dimensions of a subject on the basis of a captured image and depth information corresponding to the captured image. The depth information is information in a depth direction of the captured image, and a depth image or a depth map is information indicating a distribution of the depth information. As the depth information, an image shift amount map calculated from a plurality of viewpoint images having different viewpoints, a defocus amount map calculated by multiplying an image shift amount by a predetermined conversion coefficient, and a distance map obtained by converting a defocus amount into distance information of a subject may be used.

First Embodiment

Figure 1:
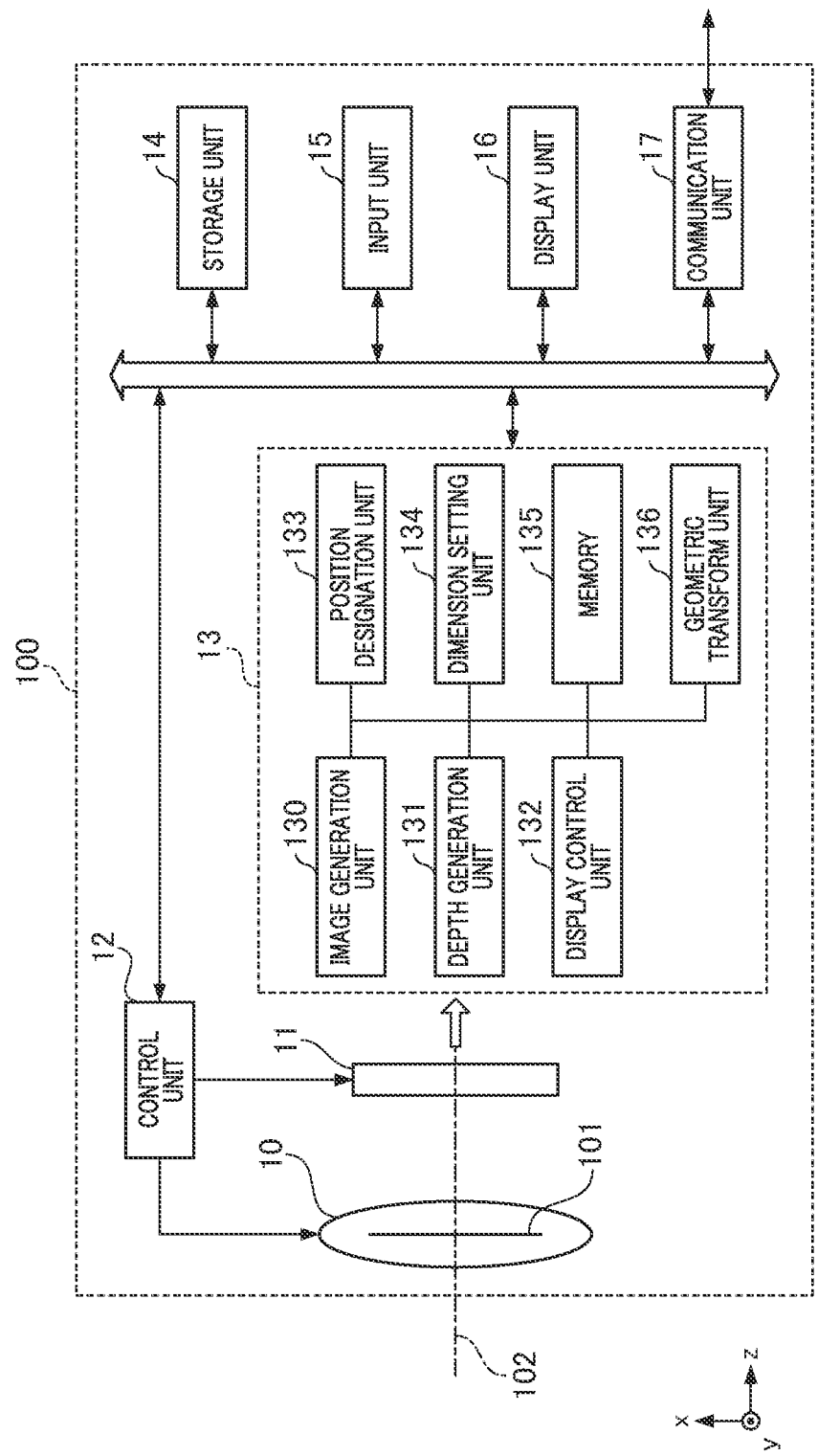
FIG. 1 is a block diagram illustrating a functional configuration of an imaging device according to an embodiment and a modification example.

A configuration of a digital camera 100 will be described with reference to FIG. 1. FIG. 1 is a block diagram illustrating a functional configuration of the digital camera 100. An imaging optical system 10 is configured with a lens unit included in the digital camera 100 or a lens device that is attachable to a camera body, and forms an optical image of a subject on an imaging element 11. The imaging optical system 10 is configured with a plurality of lenses (not illustrated) arranged on an optical axis 102, and has an exit pupil 101 at a position separated from the imaging element 11 by a predetermined distance. In the present specification, a direction parallel to the optical axis 102 is set as a z direction (depth direction). That is, the depth direction is a direction in which a subject is present with respect to a position of the digital camera 100. A direction orthogonal to the optical axis 102 and parallel to the horizontal direction of the imaging element 11 is set as an x direction, and a direction orthogonal to the optical axis 102 and parallel to the vertical direction of the imaging element 11 is set as a y direction.

The imaging element 11 is, for example, a charge-coupled device (CCD) type image sensor or a complementary metal oxide semiconductor (CMOS) type image sensor. The imaging element 11 performs photoelectric conversion on a subject image formed on the imaging surface via the imaging optical system 10 and outputs an image signal related to the subject image. As will be described later, the imaging element 11 of the present embodiment has a distance measurement function based on an imaging surface phase difference method, and, in addition to a captured image, can generate and output distance information indicating a distance from the imaging device to a subject (subject distance).

A control unit 12 includes a central processing unit (CPU), a microprocessor, and the like, and controls an operation of each constituent of the digital camera 100. For example, the control unit 12 performs autofocusing (AF: automatic focus adjustment) at the time of imaging, change of a focus (in-focus) position, a change of an F value (aperture value), capturing of an image, and the like. The control unit 12 controls an image processing unit 13, a storage unit 14, an input unit 15, a display unit 16, and a communication unit 17. The image processing unit 13 executes various types of image processing in the digital camera 100. The image processing unit 13 includes an image generation unit 130, a depth generation unit 131, a display control unit 132, a position designation unit 133, and a dimension setting unit 134. A geometric transform unit 136 will be described in an embodiment that will be described later. The image processing unit 13 has a memory 135 used as a work area for image processing. The image processing unit 13 may be configured to include a CPU and a memory storing an arithmetic processing program, in addition to a configuration using a logic circuit.

The image generation unit 130 performs various types of signal processing such as noise removal, demosaicing, luminance signal conversion, aberration correction, white balance adjustment, and color correction on an image signal output from the imaging element 11. Captured image data output from the image generation unit 130 is temporarily stored in the memory 135. The display control unit 132 reads the captured image data from the memory 135 to generate display data, and an image is displayed on a screen of the display unit 16.

The depth generation unit 131 generates a depth image indicating a distribution of depth information on the basis of a signal obtained by a distance measurement pixel of the imaging element 11. The depth image information is two-dimensional information in which a value indicated by each pixel represents distance information of a subject present in a region of a captured image corresponding to the pixel.

The display control unit 132 performs control such that a subject region in the captured image satisfying predetermined dimension measurement accuracy is displayed in an identifiable manner on the basis of the distance information of the subject. The distance information is distance information or distance range information in the z direction in FIG. 1 based on at least a depth image. Three-dimensional distance information including distance information in the x direction and the y direction may be used.

The position designation unit 133 performs a process for a user to designate a position when measuring dimensions of a subject. It is possible to acquire coordinate information in a case where the user designates at least two desired measurement positions in an image.

The dimension setting unit 134 measures a dimension between at least two points designated by the user in the position designation unit 133. The dimension may be any of a dimension in the pixel portion on an image, a dimension on an image plane converted from a pixel size, and a dimension on an object side converted with respect to an imaging magnification.

The storage unit 14, the input unit 15, the display unit 16, and the communication unit 17 are all connected to a bus. The storage unit 14 includes a nonvolatile storage medium. For example, captured image data, intermediate data generated in a processing process of each constituent, and parameters referred to in an operation of the image processing unit 13 and the digital camera 100 are stored in the storage unit 14. The storage unit 14 may be any storage unit as long as the processing performance allowed for realization of the process is guaranteed. A storage medium capable of performing high-speed reading and writing, and having a large capacity is preferable, and, for example, a flash memory, or the like, is used.

The input unit 15 is a user interface unit including a device detecting operation input of an operator. For example, an operation of inputting information to the digital camera 100 or changing a setting is detected by a dial, a button, a switch, a touch panel, or the like, and the input unit 15 outputs a signal corresponding to the operation input to the control unit 12.

The display unit 16 includes, for example, a display device such as a liquid crystal display or an organic electroluminescence (EL) display. The display unit 16 is used for checking a composition at the time of imaging based on through-display of a captured image, displaying various setting screens, reporting message information, and the like. In a case of an embodiment using a touch panel, it is possible to provide both a display function and an input function. The user can perform an operation of designating a measurement position in dimension measurement while referring to a display screen.

The communication unit 17 is a communication interface unit that transmits and receives information between the digital camera 100 and an external device. The communication unit 17 may transmit acquired captured image data, depth information, dimensions, coordinate information, dimension measurement accuracy, and the like, to an external device.

Figure 2A:
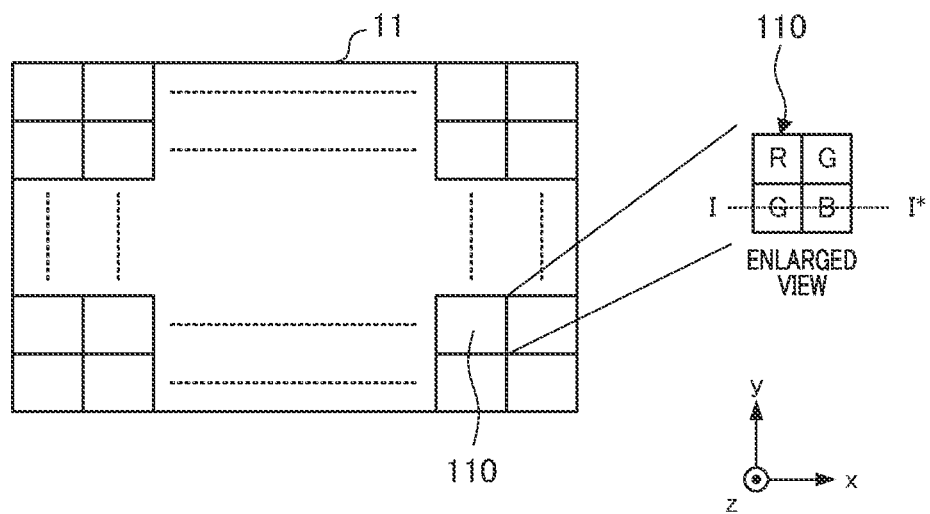
FIGS. 2A and 2B are diagrams illustrating an imaging element according to an embodiment and a modification example.
Figure 2B:
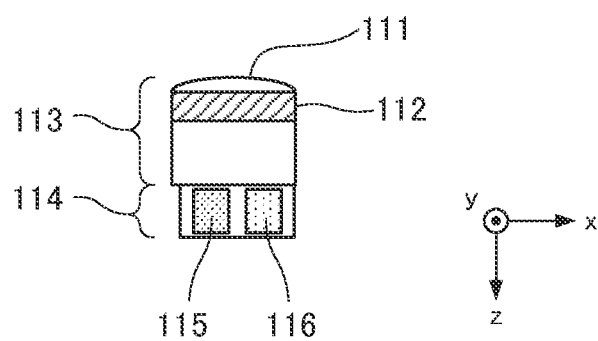

Next, a configuration of the imaging element 11 will be described with reference to FIGS. 2A and 2B. FIG. 2A is a schematic diagram illustrating an array of pixel groups, in which a direction perpendicular to the paper surface of FIG. 2A is set as the z direction, and two directions orthogonal to each other in the paper surface are set as the x direction and the y direction. FIG. 2B is a schematic diagram illustrating a pixel configuration, in which a direction perpendicular to the paper surface is set as the y direction, and two directions orthogonal to each other in the paper surface of FIG. 2B are set as the x direction and the z direction.

As illustrated in FIG. 2A, the imaging element 11 is configured with a pixel group in which a plurality of pixel portions 110 is arranged. One pixel portion 110 has a configuration of two rows and two columns to which different color filters are applied. As illustrated in the enlarged view, color filters of red (R), green (G), and blue (B) are disposed, and an image signal corresponding to color information of any of R, G, and B is output from a photoelectric conversion element configuring the pixel portion 110. FIG. 2A illustrates an example in which R is disposed on the upper left, B on the lower right, G on the lower left, and G on the upper right, but an array of color filters is not limited to this.

The imaging element 11 has a distance measurement function based on an imaging surface phase difference method. FIG. 2B is a sectional view of a unit pixel taken along the I-I* line in FIG. 2A. The unit pixel is configured with a light guide layer 113 including a microlens 111 and a color filter 112, and a light receiving layer 114 including a first photoelectric conversion portion 115 and a second photoelectric conversion portion 116. In the light guide layer 113, the microlens 111 efficiently guides incident light to the first photoelectric conversion portion 115 and the second photoelectric conversion portion 116. The color filter 112 passes light in a predetermined wavelength band. The color filter 112 transmits only light in a wavelength bandwidth corresponding to any of R, G, and B therethrough, and guides the light to the first photoelectric conversion portion 115 and the second photoelectric conversion portion 116 in the subsequent stage.

The light receiving layer 114 is provided with the first photoelectric conversion portion 115 and the second photoelectric conversion portion 116, which photoelectrically convert the received light to respectively output analog image signals. The two types of signals output from these two photoelectric conversion portions are used for distance measurement. That is, of the two photoelectric conversion portions arranged in a predetermined direction (horizontal direction) in the imaging element 11, an image signal formed of signals output from the first photoelectric conversion portion 115 will be referred to as an A image signal, and an image signal formed of signals output from the second photoelectric conversion portion 116 will be referred to as a B image signal. Depth information or distance information can be acquired from a phase difference between the A image signal and the B image signal. That is, each of the first photoelectric conversion portion 115 and the second photoelectric conversion portion 116 partially receives a light flux that is incident through the microlens 111. Therefore, the A image signal and the B image signal are pupil divided image signals related to the light flux that has passed through different pupil partial regions of the exit pupil 101 of the imaging optical system 10. The image signals (so-called additive image signals) photoelectrically converted by the first photoelectric conversion portion 115 and the second photoelectric conversion portion 116 in each pixel portion are used as captured images. That is, a signal obtained by combining the A image signal and the B image signal is equivalent to an image signal for viewing that is output, in a configuration in which each unit pixel has only one photoelectric conversion portion, from the photoelectric conversion portion.

The imaging element 11 of the present embodiment can output an image signal for viewing, and the A image signal the B image signal for distance measurement (pupil divided image). All the pixel portions configuring the imaging element 11 are provided with a plurality of photoelectric conversion portions, and can acquire high-density depth information. Although the configuration in which two photoelectric conversion portions are arranged in one pixel has been described, the present invention is not limited to this, and a configuration in which three or more photoelectric conversion portions are provided in one pixel may be used.

Figure 3A:
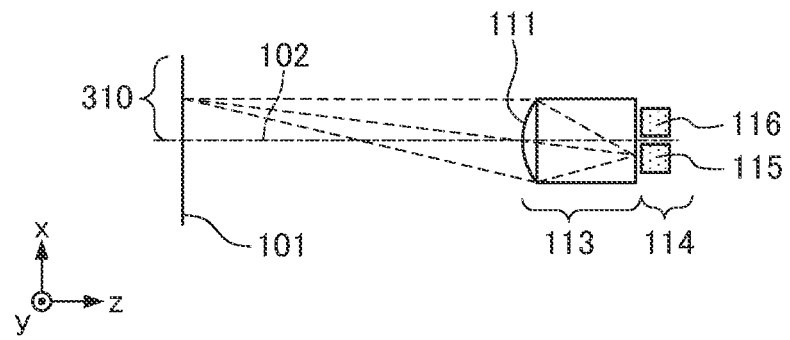
FIGS. 3A to 3E are diagrams illustrating a distance measurement principle based on an imaging surface phase difference method.
Figure 3B:
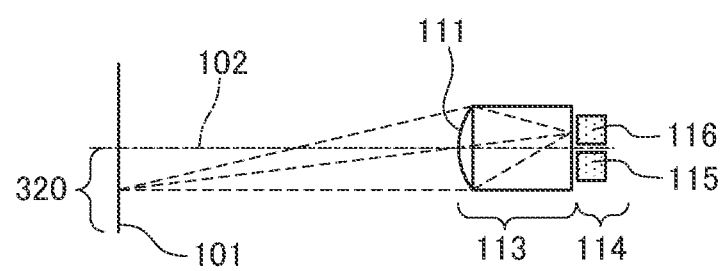

A distance measurement principle based on an imaging surface phase difference method will be described with reference to FIGS. 3A to 3E. It is possible to derive a subject distance on the basis of outputs of the first photoelectric conversion portion 115 and the second photoelectric conversion portion 116 (pupil divided image group). FIG. 3A is a schematic diagram illustrating a light flux received by the exit pupil 101 of the imaging optical system 10 and the first photoelectric conversion portion 115. FIG. 3B is a schematic diagram illustrating a light flux received by the exit pupil 101 of the imaging optical system 10 and the second photoelectric conversion portion 116. In FIGS. 3A and 3B, a direction perpendicular to the paper surface is set as the y direction, and two directions orthogonal to each other in the paper surface are set as the x direction and the z direction.

The microlens 111 illustrated in FIGS. 3A and 3B is disposed such that the exit pupil 101 and the light receiving layer 114 are optically conjugated. A light flux that has passed through the exit pupil 101 of the imaging optical system 10 is focused by the microlens 111 and guided to the first photoelectric conversion portion 115 or the second photoelectric conversion portion 116. In this case, as illustrated in FIGS. 3A and 3B, the first photoelectric conversion portion 115 and the second photoelectric conversion portion 116 mainly receive light that has passed through different pupil partial regions 310 and 320, respectively. The first photoelectric conversion portion 115 receives light that has passed through the first pupil partial region 310, and the second photoelectric conversion portion 116 receives light that has passed through the second pupil partial region 320.

The plurality of first photoelectric conversion portions 115 included in the imaging element 11 output a first image signal corresponding to the A image signal. The plurality of second photoelectric conversion portions 116 included in the imaging element 11 output a second image signal corresponding to the B image signal. An intensity distribution of an image formed on the imaging element 11 by the light that has passed through the first pupil partial region 310 may be acquired from the first image signal. An intensity distribution of an image formed on the imaging element 11 by the light that has passed through the second pupil partial region 320 may be acquired from the second image signal. A relative positional deviation amount (so-called parallax amount) between the first image signal and the second image signal is a value corresponding to a defocus amount. A relationship between a parallax amount and a defocus amount will be described with reference to FIGS. 3C, 3D, and 3E.

Figure 3C:
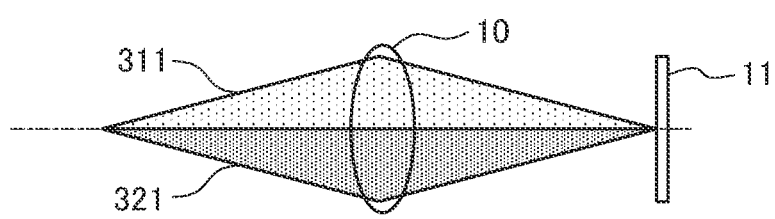
Figure 3D:
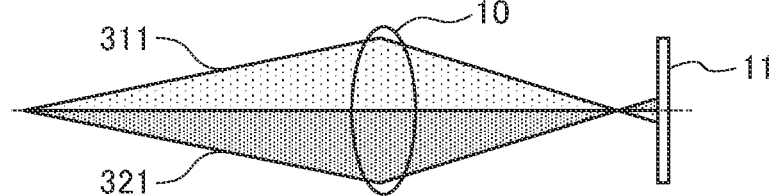
Figure 3E:
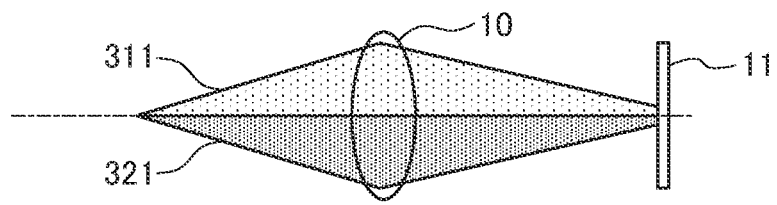

FIGS. 3C, 3D, and 3E illustrate a first light flux 311 passing through the first pupil partial region 310 and a second light flux 321 passing through the second pupil partial region 320. FIG. 3C illustrates a state at the time of focusing, and the first light flux 311 and the second light flux 321 converge on the light receiving surface of the imaging element 11. In this case, a parallax amount between the first image signal and the second image signal is zero.

FIG. 3D illustrates a defocused state in which a focus is in a negative direction (left direction) of the z axis (optical axis) on the image side. A parallax amount between the first image signal and the second image signal is a negative value. FIG. 3E illustrates a defocused state in which a focus is formed in a positive direction of the z axis on the image side. A parallax amount between the first image signal and the second image signal is a positive value. From the comparison between FIGS. 3D and 3E, it can be seen that directions of positional deviations are switched in accordance with the positive and negative of a defocus amount. It can be seen that a positional deviation occurs according to an imaging relationship (geometrical optical relationship) of the imaging optical system in accordance with a defocus amount. A parallax amount corresponding to a positional deviation between the first image signal and the second image signal may be detected by using a region-based matching method.

Figure 4A:
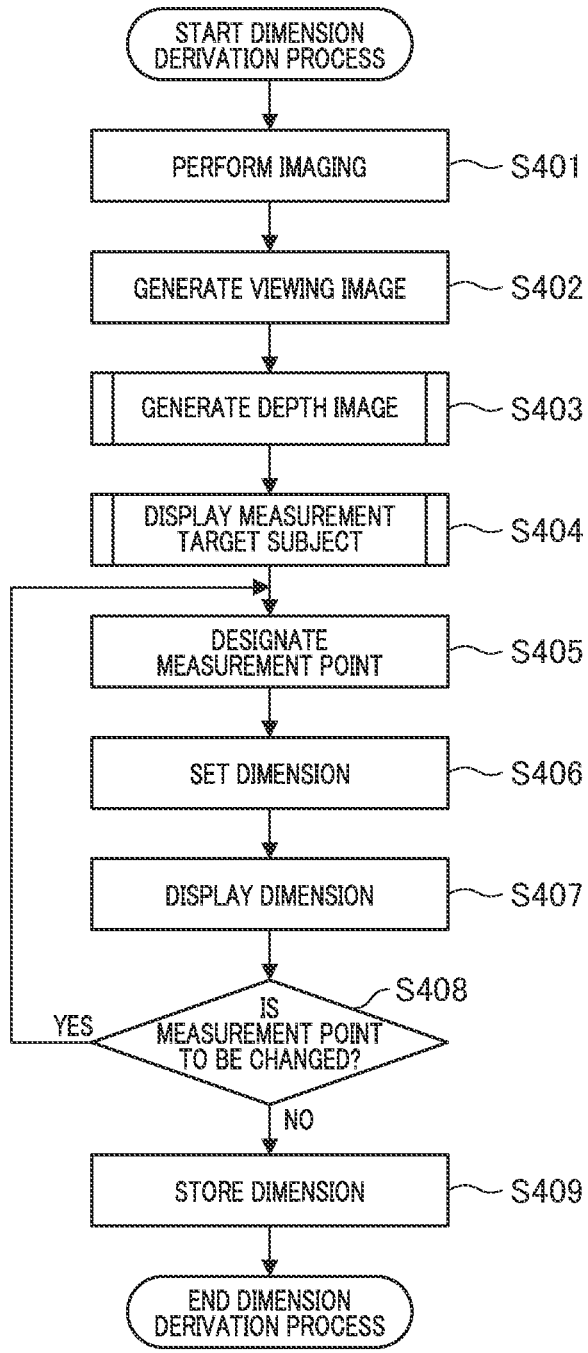
FIGS. 4A to 4C are flowcharts illustrating a process executed in a first embodiment.
Figure 4B:
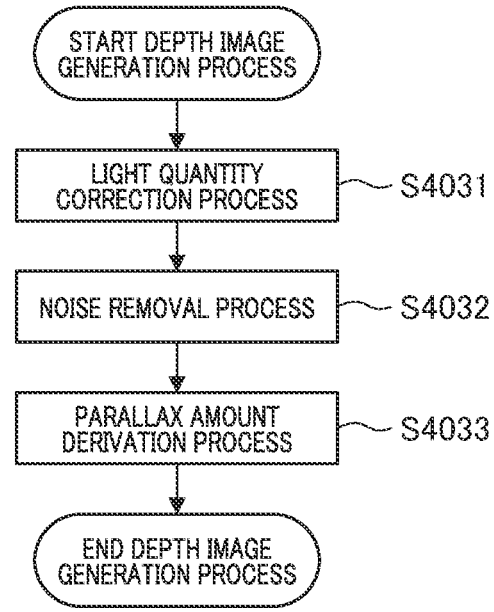

A dimension derivation process for deriving dimensions of an imaged subject will be described with reference to FIGS. 4A to 4C. FIG. 4A is a flowchart illustrating a specific processing example. The process described below can be realized by the control unit 12 reading, for example, a corresponding processing program stored in the storage unit 14, loading the program into a volatile memory (not illustrated), and executing the program. The dimension derivation process is started, for example, when the imaging device is set to a dimension measurement mode and performs imaging.

In S401, the control unit 12 executes an imaging process according to imaging settings such as a set focal position, aperture, and exposure time. More specifically, the control unit 12 performs an imaging operation using the imaging element 11 and performs control for transmitting an acquired captured image signal to the image processing unit 13. Data subjected to image processing is stored in the memory 135. Here, the captured image signal includes an image signal S1 formed of a signal output only from the first photoelectric conversion portion 115 of the imaging element 11 and an image signal S2 formed of a signal output only from the second photoelectric conversion portion 116.

In S402, the image processing unit 13 generates a viewing image from the acquired image signal. More specifically, in the image processing unit 13, first, the image generation unit 130 generates one Bayer array image by adding pixel values of respective pixels in the image signal S1 and the image signal S2. The image generation unit 130 performs a demosaicing process related to images of each color of R, G, and B on the generated Bayer array image, and generates a viewing image. The demosaicing process is a process performed according to a color filter disposed on the imaging element, and various methods are used as a demosaicing method. In addition to this, the image generation unit 130 performs processes such as noise removal or reduction, luminance signal conversion, aberration correction, white balance adjustment, and color correction. Data regarding the generated viewing image is stored in the memory 135.

In S403, the image processing unit 13 generates a depth image from the acquired image signal. The depth generation unit 131 performs a process related to generation on the depth image. A depth image generation process will be described later with reference to a flowchart of FIG. 4B. In the next step S404, the display control unit 132 performs a display process of a subject satisfying the measurement accuracy in dimension measurement. The display process of a subject related to a measurement target will be described later with reference to a flowchart of FIG. 4C.

In S405, the position designation unit 133 executes a measurement point designation process. Since the display unit 16 displays the viewing image such that a subject within a distance range satisfying the dimension measurement accuracy can be identified, a user can designate a desired measurement point. The position designation unit 133 calculates a coordinate value of a pixel position designated through an operation instruction, and sends the coordinate value to the dimension setting unit 134.

In S406, the dimension setting unit 134 calculates a distance on the image between the measurement points designated in S405, that is, a distance in the pixel unit. The distance in the pixel unit is, for example, a Euclidean distance on the image, and does not have to be an integer value. Subsequently, the dimension setting unit 134 calculates an imaging magnification from a distance to the subject at an in-focus position (subject distance) and a focal length of the imaging optical system 10 at the time of imaging. From a pixel size of the imaging element 11 and the imaging magnification, a size of a space occupied by one pixel at a focusing distance on the object side can be calculated. The dimension setting unit 134 calculates a distance between the measurement points on the object side, that is, a distance in a three-dimensional space, on the basis of the distance in the pixel unit between the measurement points and the size of one pixel on the object side. Data regarding the calculated distance is stored in the memory 135.

In S407, the display control unit 132 reads the distance data calculated in S406 from the memory 135, and controls operations for displaying dimensions on the screen of the display unit 16. In S408, the dimension setting unit 134 determines whether or not the user is to change the measurement point. The change of the measurement point is determined on the basis of an operation instruction from the user. In a case when it is determined that the measurement point is to be changed, the flow returns to S405 and the processes from S405 to S407 are continued. In a case when it is determined that the measurement point is not to be changed, the flow proceeds to S409.

In S409, the dimension setting unit 134 adds information (coordinates on the image) regarding the designated measurement points and the calculated dimension information to the viewing image data as additional information, and stores the information in the storage unit 14. Information regarding the measurement accuracy may be added.

The depth image generation process will be described with reference to FIG. 4B. In S4031, the depth generation unit 131 performs a light quantity correction process on the image signal S1 and the image signal S2. At a peripheral angle of view of the imaging optical system 10, the balance in an amount of light between the image signal S1 and the image signal S2 is lost due to a difference in shape between the first pupil partial region 310 and the second pupil partial region 320 because of vignetting. Therefore, in this step, the depth generation unit 131 corrects light amounts of the image signal S1 and the image signal S2 by using, for example, light amount correction values stored in advance in the memory 135.

In S4032, the depth generation unit 131 performs a process of reducing noise generated during conversion in the imaging element 11. Specifically, the depth generation unit 131 performs a filtering process on the image signal S1 and the image signal S2 to realize noise reduction. In general, the higher a spatial frequency, the lower a signal-to-noise (S/N) ratio, and, thus, a noise component relatively increases. Therefore, the depth generation unit 131 performs a process by using a low-pass filter of which a passing ratio decreases as a spatial frequency increases. The light amount correction shown in S4031 may not be a suitable result depending on a manufacturing error, or the like, of the imaging optical system 10. Thus, the depth generation unit 131 employs a bandpass filter that cuts off a DC component and has a low passing ratio of a high frequency component.

In S4033, the depth generation unit 131 derives a parallax amount between the A image and the B image on the basis of the image signal S1 and the image signal S2. Specifically, the depth generation unit 131 sets a point of interest corresponding to representative pixel information and a collation region centered on the point of interest in the A image corresponding to the image signal S1. The collation region is, for example, a rectangular region such as a square region having a predetermined length on one side centered on the point of interest. Next, the depth generation unit 131 sets a reference point in the B image corresponding to the image signal S2, and sets a reference region centered on the reference point. The reference region has the same size and shape as those of the above collation region. The depth generation unit 131 calculates the degree of correlation between an image included in the collation region related to the image signal S1 and an image included in the reference region related to the image signal S2 while sequentially moving the reference point. The reference point having the highest degree of correlation is designated as the corresponding point corresponding to the point of interest in the image signal S2. A relative positional deviation amount between a specified corresponding point and the point of interest corresponds to a parallax amount at the point of interest.

The depth generation unit 131 calculates a parallax amount while sequentially changing the points of interest according to representative pixel information, and, thus, derives parallax amounts at a plurality of pixel positions determined by the representative pixel information. For the sake of simplicity in the present embodiment, the number of pixel positions (pixel groups included in the representative pixel information) for calculating parallax amounts is set to be the same as that in a viewing image in order to obtain depth information at the same resolution as that of the viewing image. As a method of deriving the degree of correlation, methods such as NCC, SSD, and SAD are used. NCC stands for "normalized cross-correlation". SSD stands for "sum of squared difference", and SAD stands for "sum of absolute difference".

The calculated parallax amount (indicated by d) is converted into a defocus amount by using a predetermined conversion coefficient. The amount of defocus corresponds to a distance from the imaging element 11 to a focal point of the imaging optical system 10. Here, the predetermined conversion coefficient is expressed as K, and the defocus amount is expressed as ΔL. The parallax amount d is converted into a defocus amount ΔL by using the following Equation (1).

$$\Delta L = K \times d \tag{1}$$

The defocus amount ΔL may be converted into a subject distance by using the lens formula in the geometrical optics expressed in the following Equation (2).

$$1/A + 1/B = 1/F \tag{2}$$

In Equation (2), A represents a distance (subject distance) from an object surface to a principal point of the imaging optical system 10, B represents a distance from the principal point of the imaging optical system 10 to an image plane, and F represents a focal length of the imaging optical system 10. In Equation (2), since a value of B can be derived from the defocus amount ΔL, the distance A can be derived on the basis of a setting of the focal length F at the time of imaging. The depth generation unit 131 generates two-dimensional information having the derived subject distance as a pixel value, and stores depth image data based on the two-dimensional information in the memory 135.

Figure 4C:
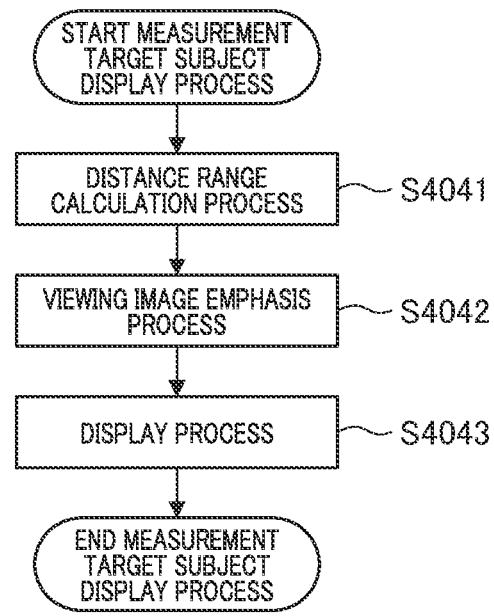

With reference to FIG. 4C, a process performed by the display control unit 132 in S404, that is, a process related to display of a subject satisfying the measurement accuracy in the dimension measurement will be described. First, the dimension measurement accuracy will be described. A subject corresponding to a region present in an image captured by a central projection optical system has different imaging magnifications depending on a distance from the imaging device (a distance in the z direction). As a result, a subject located far from the imaging device is imaged as a smaller region in an image than a subject located near the imaging device. This difference in imaging magnification occurs due to a difference in distance within a subject even for the same subject, and affects the dimension measurement accuracy.

From the above description, it can be seen that, in a case when distances to measurement points for dimension measurement in the z direction are different, imaging magnifications are different, and, thus, the dimension measurement accuracy deteriorates. Therefore, in order to suppress the deterioration in the dimension measurement accuracy due to the imaging magnification and to perform measurement within a desired dimension measurement error, it is necessary to keep the measurement point within a predetermined distance range in the z direction.

Here, a true dimension of a dimension measurement target object is expressed as h, and an error due to the change in imaging magnification is expressed as Δh [%]. A position of a subject, that is, a distance from the imaging device to the subject is expressed as Z, and a distance error is expressed as ΔZ. In this case, the error Δh is expressed by the following Equation (3).

$$\Delta h[\%] = (-\Delta Z \times 100)/(Z + \Delta Z) \tag{3}$$

In order to keep the dimension measurement accuracy within ±Δh [%], the error ΔZ from the subject distance Z that is a reference for dimension measurement is required to be within a value expressed in the following Equation (4).

$$\Delta Z = \Delta h \times Z/(100 + \Delta h) \tag{4}$$

A distance range for satisfying the designated dimension measurement accuracy+Δh is a range of Z+ΔZ to Z−ΔZ. These values are shown in the following Equations (5) and (6).

$$Z + \Delta Z = (100 + 2 \times \Delta h)Z/(100 + \Delta h) \tag{5}$$

-continued $$Z - \Delta Z = (100 - 2 \times \Delta h)Z/(100 - \Delta h) \quad (6)$$

The measurement accuracy Δh is acquired by reading a value stored in the storage unit 14 in advance. Alternatively, a user may input a desired measurement accuracy by using the input unit 15.

In S4041 in FIG. 4C, a distance range calculation process is executed. The distance Z from the imaging device to the subject is set as a distance to the subject in focus at the time of imaging. If a desired dimension measurement accuracy is given, a process of specifying a distance range satisfying the desired dimension measurement accuracy is performed by using Equations (5) and (6). A subject region in the image within the distance range is specified by using the depth image.

Subsequently, in S4042, an enhancement process for the viewing image is executed. The data regarding the viewing image generated in S402 and stored in the memory 135 is read. Image processing is performed on the read viewing image data such that a subject region within a distance range satisfying the desired dimension measurement accuracy designated in S4041 can be identified. As an identifiable display method, there are a method of replacing a subject region within a distance range satisfying the dimension measurement accuracy with that in a specific color and displaying the subject region, and a method of displaying the subject region that is specific color-toned.

Figure 5A:
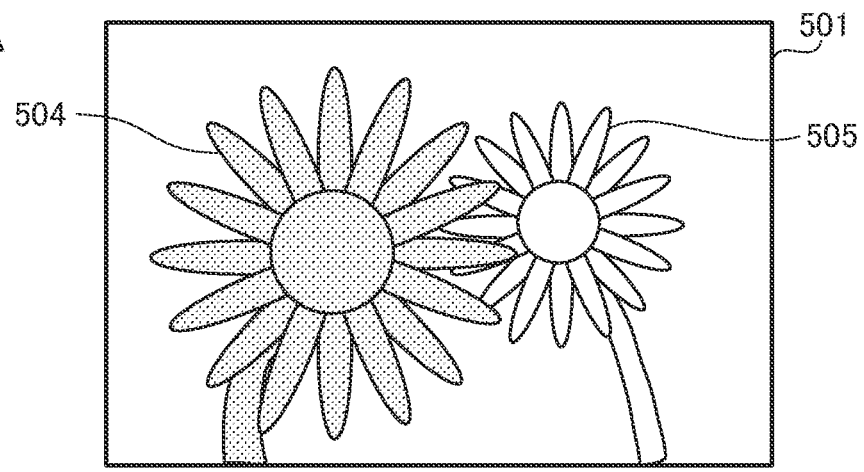
FIGS. 5A to 5C are diagrams illustrating an operation performed when a dimension derivation process is executed.
Figure 5B:
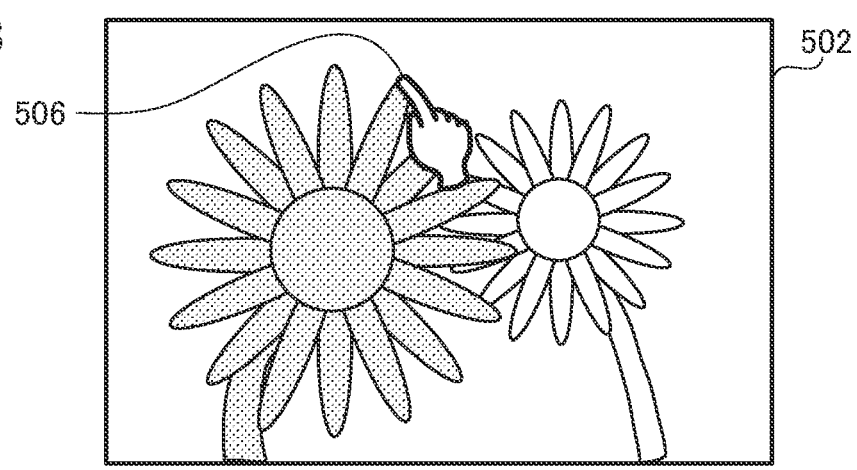
Figure 5C:
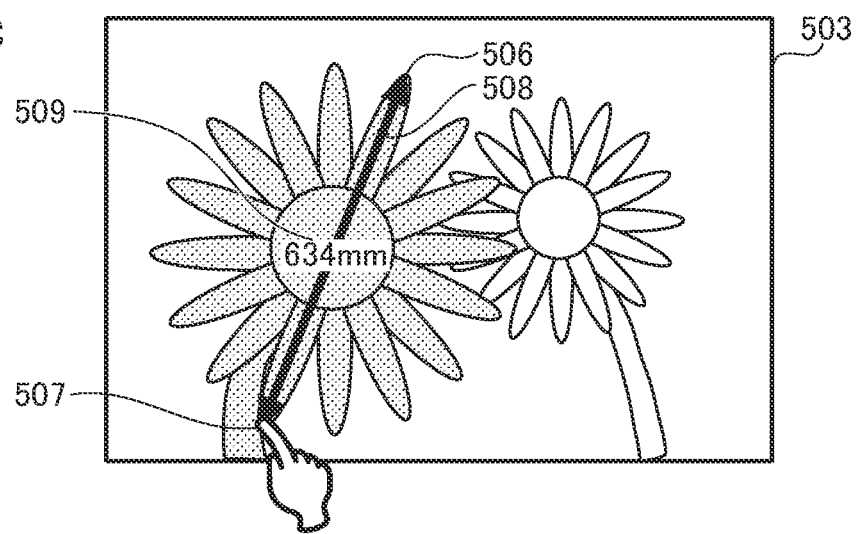

A display process is executed in S4043. The display unit 16 displays the viewing image processed by S4042 on the screen. The user can identify the subject region within the distance range satisfying the desired dimension measurement accuracy. FIGS. 5A to 5C are explanatory diagrams illustrating an operation of reproducing and displaying an image on the screen of the display unit 16.

In a viewing image 501 illustrated in FIG. 5A, a subject region within the distance range satisfying the desired dimension measurement accuracy is displayed in an identifiable manner. Of subject regions 504 and 505, the subject region 504 represents a region that is identifiable by changing a color.

In S405 in FIG. 4A, the user designates a measurement point in a viewing image 502 displayed on the display unit 16. For example, as illustrated in FIG. 5B, the user designates a start point position on a subject of which dimensions are desired to be measured on a touch panel provided on the display unit 16. A point 506 indicates a start point designated by the user. Subsequently, as illustrated in FIG. 5C, the user designates an end point 507 of the measurement on a viewing image 503. The position designation unit 133 calculates a coordinate value of the pixel position designated by the user, and sends the coordinate value to the dimension setting unit 134.

Measurement positions may be selected by touching two points on the image with the user's finger, but may also be designated by tracing a trajectory on the image. In the case of the designation method by tracing a trajectory on the image, the trajectory traced by the user may be acquired and a dimension of a curve along the trajectory may be measured.

As illustrated in FIG. 5C, a straight line connecting the start point and the end point of the designated dimension measurement or a curve traced by the user is superimposed and displayed on the viewing image and presented to the user. In particular, in a case when the user designates the measurement positions by tracing a trajectory, a process of displaying the trajectory from the start point in real time is performed. An arrow 508 in FIG. 5C indicates an example in which the start point 506 and the end point 507 of the designated dimension measurement are connected by a straight line and displayed.

The display control is performed such that the subject region within the distance range satisfying the desired dimension measurement accuracy from the reference distance in the depth direction can be identified, and, thus, it is possible for the user to visually recognize the region of the guaranteed measurement accuracy. The distance range satisfying the desired dimension measurement accuracy is a distance range in which the dimensional setting unit 134 can measure a distance with a measurement accuracy equal to or higher than the reference. When designating a measurement point, the position designation unit 133 can ensure the measurement accuracy by making it possible to select only a pixel in the subject region within the distance range satisfying the dimension measurement accuracy displayed in an identifiable manner. In this case, in a case when a position of the selected pixel is in a region outside the distance range satisfying the dimension measurement accuracy, the display control unit 132 performs display control for providing a notification that selection is not possible on the display unit 16.

In S406 in FIG. 4A, the dimension setting unit 134 calculates a distance on the image between the measurement points designated in S405, that is, the distance in the pixel unit. The calculated distance information is temporarily stored in the memory 135, and, in S407, the display control unit 132 reads the distance information from the memory 135 and converts the distance information into a distance on the object side (distance in the three-dimensional space), and the converted distance is displayed by a numerical expression 509 in FIG. 5C on the screen of the display unit 16. The conversion into the distance on the object side may be performed by the dimension setting unit 134.

In the description hitherto, as a display method that makes it possible to identify the subject region within the distance range satisfying the dimension measurement accuracy, a method of replacing the subject region with that in a specific color and a method of displaying the subject region that is specific color-toned have been described. A display method is not limited to these examples. FIGS. 6A to 6D illustrate another display method.

FIGS. 6A to 6D illustrate examples of viewing images 601 to 604 having different display methods. A subject region 605 is a subject region within a distance range satisfying the dimension measurement accuracy. A subject region 606 is a subject region other than a subject within the distance range satisfying the dimension measurement accuracy.

Figure 6A:
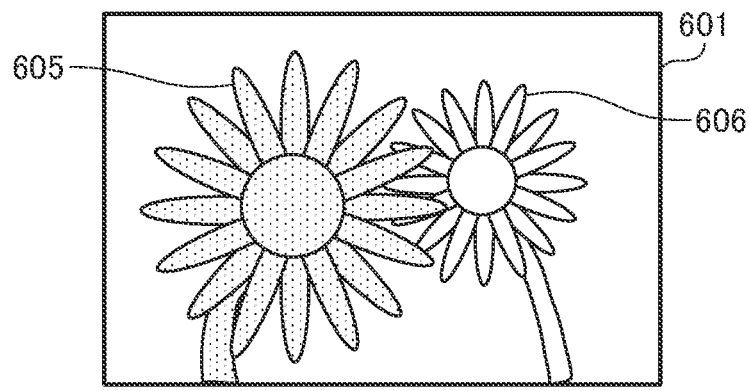
FIGS. 6A to 6D are diagrams illustrating a method of highlighting a subject region.
Figure 6B:
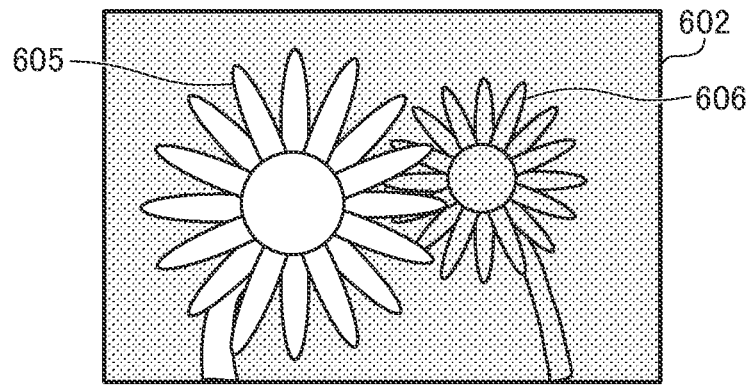
Figure 6C:
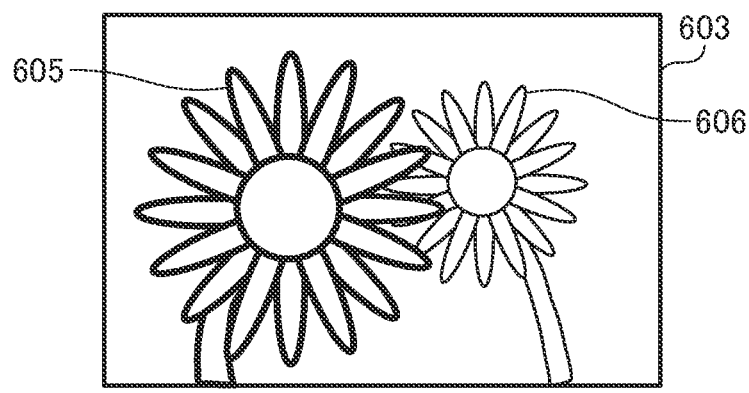

FIG. 6A illustrates an example in which a method of displaying the subject region 605 by changing a luminance instead of a color is applied. FIG. 6B illustrates an example in which a method of changing and displaying a color or a luminance of an image region other than the subject region 605 is applied.

In dimension measurement, in general, edge-to-edge measurement is performed to measure a dimension from one end of the subject region to the other end. It is not always necessary to display the whole of a subject present within a range satisfying the desired dimension measurement accuracy in an identifiable manner. Edges in the image may be detected, and only edges present in the subject region within the distance range satisfying the dimension measurement accuracy may be displayed in an identifiable manner. FIG.

6C illustrates an example in which a method of highlighting edges in the subject region 605 in an identifiable manner is applied.

Figure 6D:
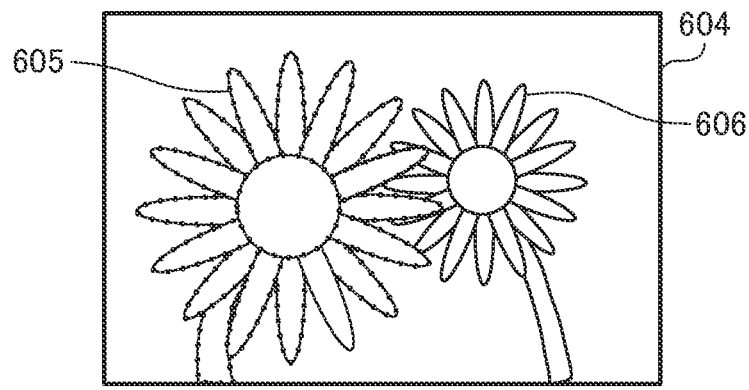

A specific symbol may be superimposed and displayed. FIG. 6D illustrates an example in which a method of superimposing and displaying dots on edges in the subject region 605 is applied. Regarding a display method, any method other than those described here may be used as long as a user can be notified of the subject region within the distance range satisfying the designated dimension measurement accuracy.

According to the present embodiment, it is possible to highlight an image region corresponding to a subject within a distance range that can be measured with the set dimension measurement accuracy. More specifically, a subject region present in a specific distance range is extracted by using a depth image on the basis of dimension measurement accuracy set with a focusing distance as a reference, and is displayed in an identifiable manner. As a result, it is possible to assist a user in selecting a measurement point in dimension measurement.

In the present embodiment, an example has been described in which the imaging element 11 has a photoelectric conversion portion based on an imaging surface phase difference method and acquires a viewing image and a depth image. When carrying out the present invention, a method of acquiring depth information is not limited to this. For example, depth information may be acquired on the basis of a plurality of captured images obtained from a plurality of imaging optical systems or imaging devices. Alternatively, depth information may be acquired by using a stereo ranging method using a light irradiation unit and an imaging device, a method using a combination of a time of flight (TOF) method and an imaging device, and the like.

In the present embodiment, an example of the process from executing position designation to executing dimension setting has been described, but when carrying out the present invention, the position designation unit and the dimension setting unit are not necessarily required. If a reference distance and desired dimension measurement accuracy are given, it is possible to control display such that a subject within a range satisfying the desired dimension measurement accuracy can be identified.

Second Embodiment

Next, a second embodiment of the present invention will be described. In the first embodiment, an aspect has been described in which a distance range satisfying predetermined dimension measurement accuracy is calculated with a focusing distance as a reference, and a subject within the distance range is displayed in an identifiable manner to assist in designating a measurement point. The reference distance does not have to be a distance based on an in-focus position. Therefore, in the present embodiment, a distance corresponding to a measurement point designated by a user is set as a reference distance. For example, the user designates a measurement point on an image displayed on the display unit 16. A process of acquiring a distance corresponding to a designated point from the depth image is performed, and the acquired distance is set as a reference distance. Hereafter, differences from the first embodiment will be described, and a detailed description thereof will be omitted by using the already used references or symbols for the same matters as those of the first embodiment. A method of omitting such a description is the same in the embodiments described later.

Figure 7:
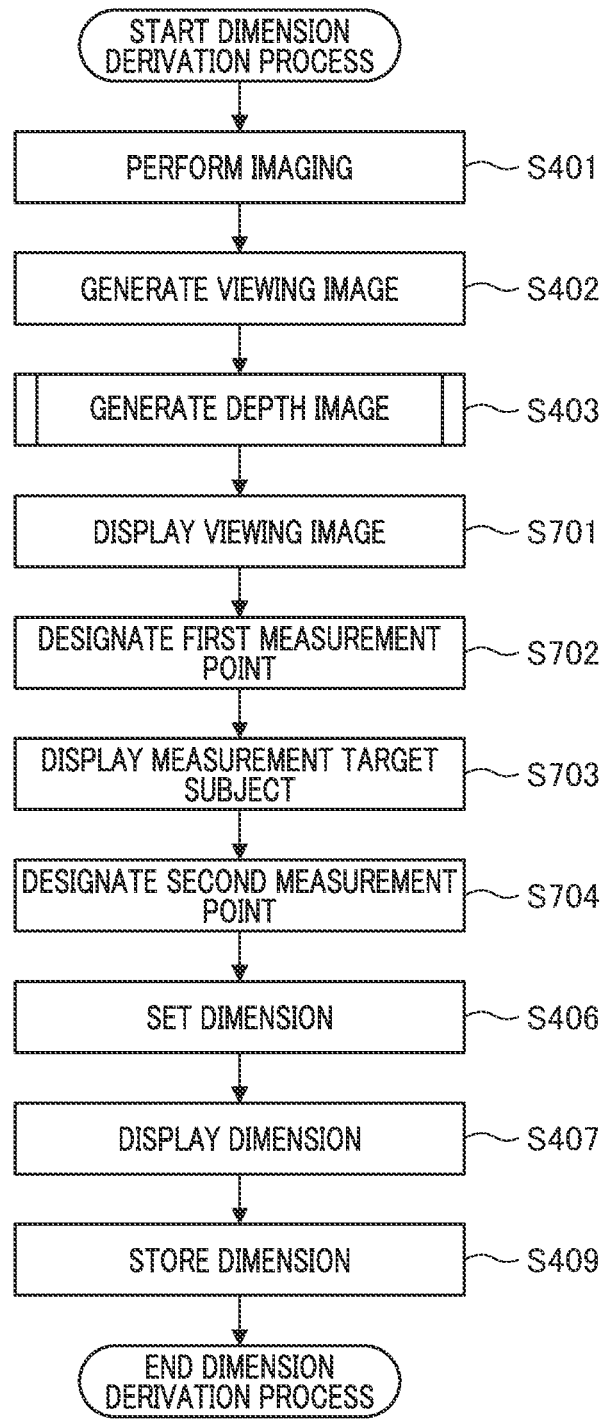
FIG. 7 is a flowchart illustrating a process executed in a second embodiment.

A dimension derivation process according to the present embodiment will be described with reference to a flowchart of FIG. 7. Processes in S701 to S704 that are different from those in FIG. 4A will be described. After S401 to S403, the flow proceeds to S701.

Figure 8A:
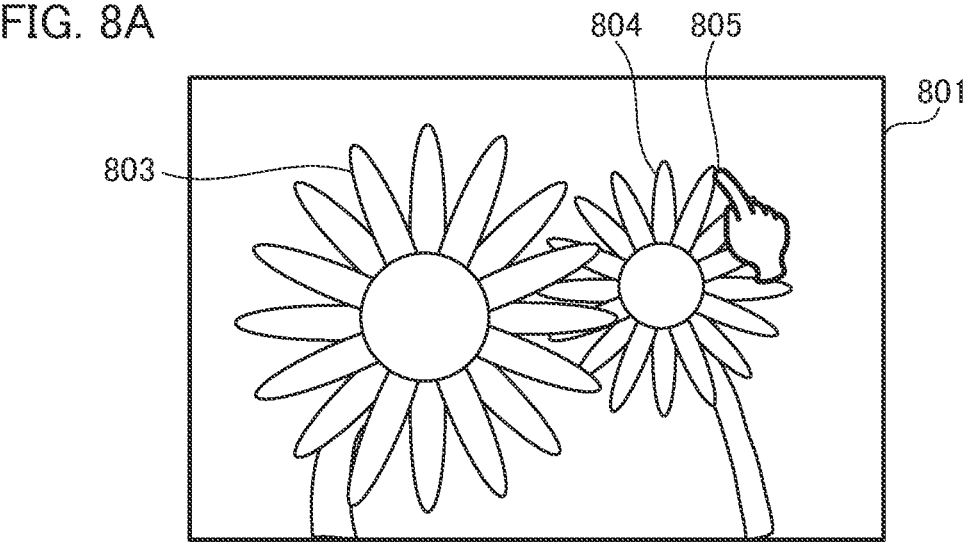
FIGS. 8A and 8B are diagrams illustrating an operation performed when a dimension derivation process is executed according to the second embodiment.

In S701, the display control unit 132 performs control for reading data regarding the viewing image generated in S402 from the memory 135 and display the viewing image on the screen of the display unit 16. FIG. 8A illustrates an example of a displayed viewing image 801. Subject regions 803 and 804 respectively correspond to subjects to which distances from the digital camera 100 are different.

In S702, the position designation unit 133 performs a process related to designation of a first measurement point. A process for urging the user to specify a first measurement point, which is a reference for performing dimension measurement, is executed. As illustrated in FIG. 8A, the user designates a first measurement point 805 that is a desired measurement point in the viewing image 801 displayed on the display unit 16. A process of acquiring a distance on the depth image corresponding to coordinates of the measurement point 805 on the designated viewing image is performed. The acquired distance is sent to the process in S703 as a reference distance.

In S703, in addition to the method of setting a distance range in the first embodiment, a range is restricted by a distance on the image plane (xy plane). A captured image may be distorted due to distortion aberration of the imaging optical system 10. The distortion depends on an angle of view and, thus, differs depending on an image height on the image plane. The distortion ratio data is previously stored in the storage unit 14 as a function depending on an image height. By using this data, a process of setting an image height range (a distance range in the xy plane) corresponding to the measurement error $\Delta hxy$ [%] caused by the distortion is executed. When an error due to an imaging magnification is expressed as $\Delta hz$, a region where a measurement error finally falls within $\Delta h$ [%] satisfies the following Expression (7).

$$\Delta h \le \Delta hz + \Delta hxy \qquad (7)$$

Figure 8B:
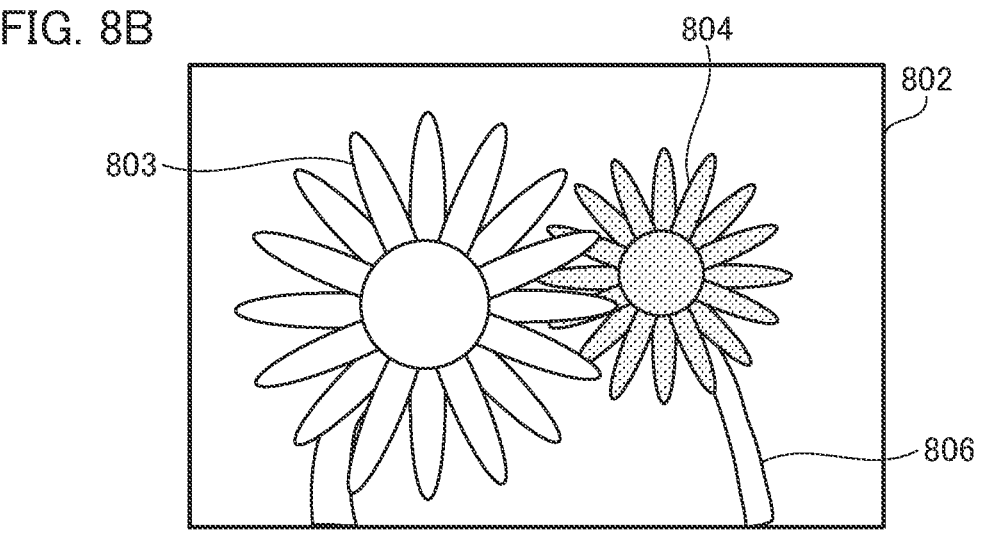

According to the same method as the display method described in S404 in FIG. 4A, a process of displaying a subject region satisfying the dimension measurement accuracy defined by Expression (7) in an identifiable manner is performed. For example, as illustrated in FIG. 8B, an image 802 is displayed on the screen of the display unit 16. With a distance of the first measurement point 805 designated by the user as a reference, a subject region (a right flower region in FIG. 8B) satisfying the set dimension measurement accuracy is displayed in an identifiable manner by color coding, or the like. As a result of considering the influences of the imaging magnification and the distortion in the subject region 804, it is illustrated that a stem region 806 does not satisfy the designated dimension measurement accuracy.

In S704, the position designation unit 133 performs a process related to designation of a second measurement point. A process of prompting the user to designate a second measurement point as an end point is executed. When the user designates the second measurement point, a process of acquiring coordinate information of the designated second measurement point is performed, the flow proceeds to the process in S406, and the processes in S406, S407, and S409 are executed.

In the present embodiment, in a case when the user designates the first measurement point serving as a measurement reference, a distance range satisfying the dimension measurement accuracy is calculated on the basis of a subject distance (a distance from the imaging device to the subject) at the designated measurement point. Therefore, it is possible to measure dimensions with a higher degree of freedom. When calculating a distance range satisfying the dimension measurement accuracy, the distance range in each direction (x, y, and z directions) is set by taking into consideration not only the influence of an imaging magnification but also an error caused by the distortion. By extending the distance range satisfying the dimension measurement accuracy in a plurality of directions, it is possible to restrict the distance range satisfying the dimension measurement accuracy to higher accuracy.

Figure 9:
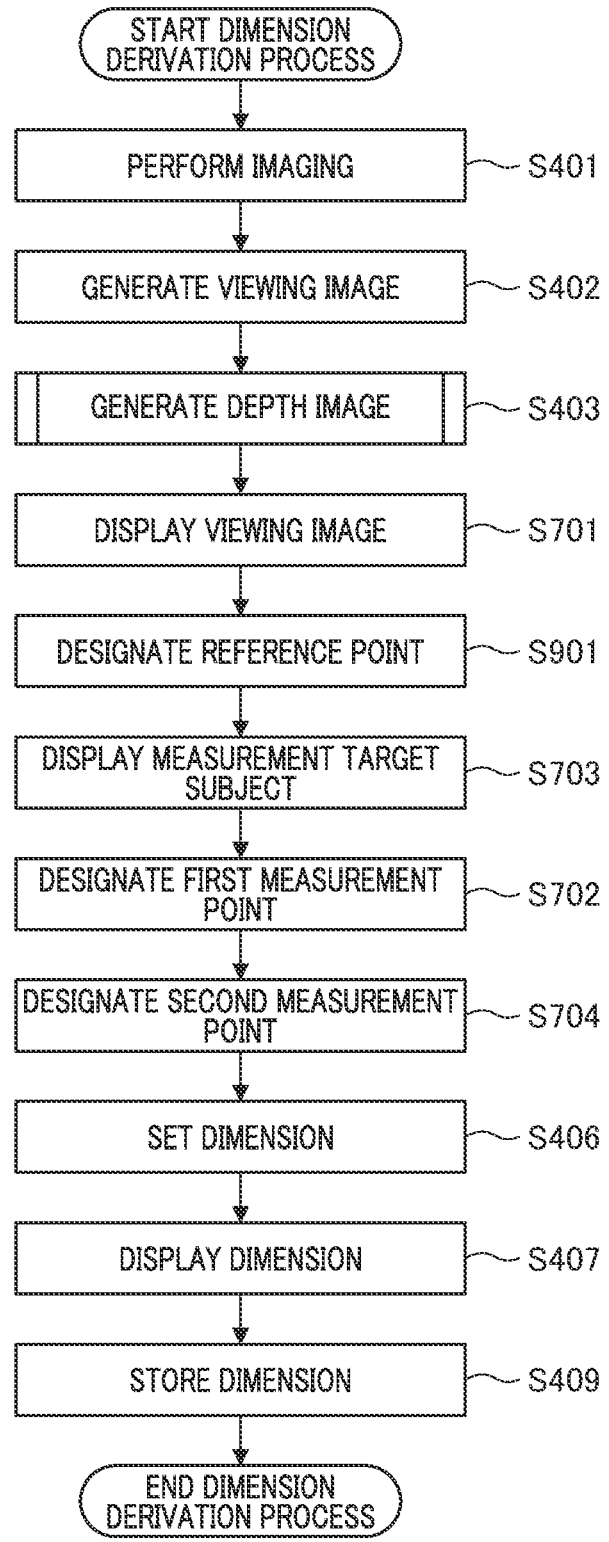
FIG. 9 is a flowchart illustrating a process executed in a modification example.

A modification example of the second embodiment will be described with reference to a flowchart of FIG. 9. In FIG. 9, the process in S901 is performed between S701 and S703, and, then, the processes in S703, S702, and S704 are performed. In the second embodiment, a subject region within the distance range satisfying the dimension measurement accuracy is determined with a position of the designated first measurement point as a reference position, but, in the present modification example, a reference point designation process S901 is added.

In S901 after S701, a reference point is designated by the user. On the basis of a position of the designated reference point, in S703, a subject region within the distance range satisfying the dimension measurement accuracy is displayed in an identifiable manner. Subsequently, in S702 and S704, a process of designating the first measurement point and the second measurement point is executed, respectively. Thereafter, dimension measurement is executed (S406).

Third Embodiment

A third embodiment of the present invention will be described with reference to FIG. 10. In the above embodiment and modification example, a case when only a subject region within a distance range satisfying specific dimension measurement accuracy is displayed in an identifiable manner has been described. It is not necessary to restrict a subject region displayed in an identifiable manner to a single subject region. For example, as a dimension measurement error, a subject region corresponding to the following plurality of non-overlapping ranges is assumed.

A first subject region in which a dimension measurement error is less than 1%.
A second subject region in which a dimension measurement error is 1% or more and less than 3%.
A third subject region in which a dimension measurement error is 3% or more and less than 5%.

The display control unit 132 of the present embodiment performs control for displaying each of a plurality of subject regions satisfying the same degree of dimension measurement accuracy in an identifiable manner. In this case, the respective subject regions are displayed on the screen, for example, in different colors or luminances such that a user can individually identify each region.

Figure 10:
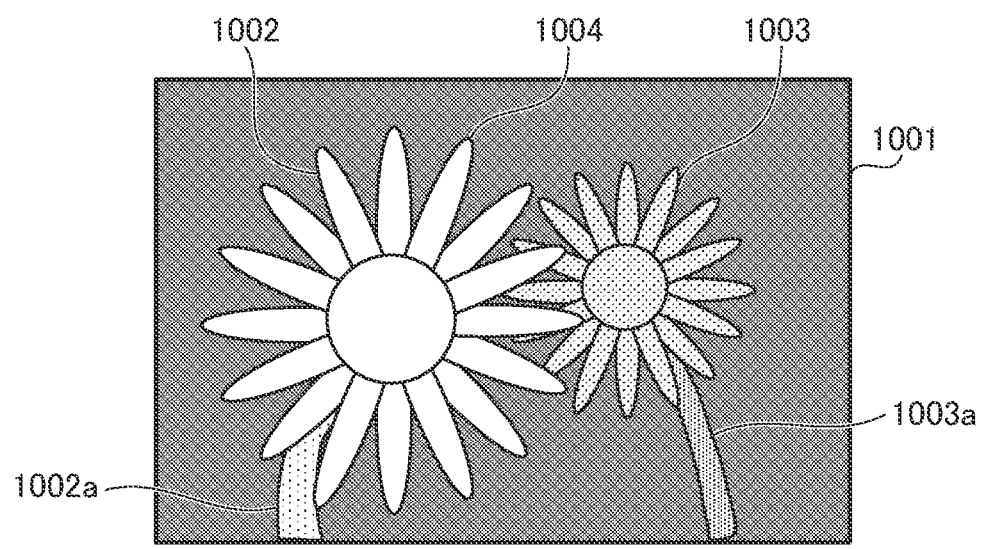
FIG. 10 is a diagram illustrating a method of highlighting a subject region in a third embodiment.

FIG. 10 illustrates an example in which subject regions 1002 and 1003 corresponding to a plurality of subjects are present in a viewing image 1001. In the subject region 1002, an end point of a petal is set as a measurement reference point 1004. In this case, a dimension measurement error in the flower region within the subject region 1002 from the measurement reference point 1004 is less than 1%, which corresponds to a first subject region. The first subject region is displayed to be identifiable with the first luminance, for example, by changing a luminance. A stem region 1002a has a different distance from the measurement reference point 1004, and a dimension measurement error is 1% or more. Assuming that this region is, for example, a second subject region, the region is displayed to be identifiable with a second luminance different from that of the subject region 1002 (flower region).

The subject region 1003 illustrated in FIG. 10 has a flower region different from the subject region 1002 and a stem region 1003a thereof. These regions have a large difference in distance from the measurement reference point 1004, and are thus displayed separately by using different luminances. In the example in FIG. 10, the display control unit 132 performs display such that the luminance becomes lower as the dimension measurement error becomes larger.

Since the display is performed by using different luminances, colors, symbols, or the like, for the regions having different dimension measurement errors, the user can easily identify each region. The display control unit 132 controls display of subject regions corresponding to a plurality of dimension measurement errors. In this case, the user may switch at any time whether to display a region corresponding to a single dimension measurement accuracy or to display regions corresponding to a plurality of dimension measurement accuracies. The user may use the input unit 15 to set how many dimension measurement accuracy ranges are to be separated (divided) and displayed, and to set the number of separations and an input setting of a range. Regarding display of each of subject regions corresponding to a plurality of dimension measurement accuracies, a focusing distance may be used as a reference, or a position of a measurement point designated by the user may be used as a reference as in the modification example.

In the present embodiment, it is possible to distinguish and to display a plurality of subject regions respectively corresponding to a plurality of dimension measurement accuracies, and the user can identify the subject regions in more detail. The present embodiment is effective, for example, in a case when subject regions that satisfy dimension measurement accuracy range are distinguished, especially, in a case when a width of a depth distribution of a measurement target is large.

Fourth Embodiment

Next, a fourth embodiment of the present invention will be described. In the above embodiment, in a case when distance information is acquired, a distance resolution at the time of distance measurement differs depending on a distance. The farther the distance from the imaging device to a subject is, the lower the distance resolution is. Since the uncertainty of the distance resolution occurs in the distance measurement, the uncertainty of the imaging magnification occurs, and the dimension measurement accuracy at a calculated distance can be obtained. If a distance measurement error is taken into consideration, in addition to the uncertainty of the distance resolution, the uncertainty corresponding to the distance measurement error occurs. Taking these into consideration, the dimension measurement accuracy for each calculated distance can be calculated.

By using the dimension measurement accuracy calculated for each distance, it is possible to specify a distance range having a distance resolution satisfying the dimension measurement accuracy designated by the user. It is also possible to specify a distance range with different dimension measurement accuracies depending on a distance resolution.

In the present embodiment, the depth generation unit 131 can display a predetermined subject region in an identifiable manner by using the dimension measurement accuracy calculated from the distance resolution in the depth image. The predetermined subject region is a distance range satisfying the dimension measurement accuracy, or a subject region corresponding to a plurality of divided distance ranges in accordance with the dimension measurement accuracy.

The display control unit 132 acquires dimension measurement accuracy calculated from the distance resolution and the distance measurement error in the distance measurement, calculates a subject region satisfying the predetermined dimension measurement accuracy, and controls highlighting. The present embodiment is effective in a case when dimension measurement is performed in consideration of the dimension measurement accuracy by using a distance measuring method.

Fifth Embodiment

Next, a fifth embodiment of the present invention will be described. In the present embodiment, a description will be made of an effective process in a case when a subject corresponding to a region including a first measurement point designated by the position designation unit 133 is a subject having a substantially planar shape.

In a case when a subject having a substantially planar shape is imaged in a facing manner to a camera, the entire surface of the subject is approximately equidistant from the camera. In the case of the above embodiments, a region of the entire surface of the subject is displayed as a subject region satisfying the predetermined dimension measurement accuracy.

On the other hand, in a case when a subject having a substantially planar shape is imaged in a non-facing manner to a camera, only a subject region within a distance range satisfying the dimension measurement accuracy is displayed to be identifiable for a distance at the designated first measurement point. That is, it is possible to perform dimension measurement satisfying predetermined accuracy for only a part of the subject, and the dimension measurement accuracy is reduced for another subject region in the same subject.

In a case when a subject is a plane imaged in a non-facing manner to the camera and a depth image for the plane can be acquired, geometric transform is possible. That is, it is possible to transform an inclined plane into a plane confronting the front through the geometric transform. Through the geometric transform, an image of a planar subject that is captured with different sizes depending on distances from the camera is converted into an image of that having the same size at the same distance. For example, in a case when a square subject is imaged in a non-facing manner, the subject does not appear as a square shape (trapezoidal or the like) on an image, but may be converted into a square shape by calculating an inclination on the basis of distance information.

The image processing device of the present embodiment includes a geometric transform unit 136 (refer to FIG. 1), and determines whether or not a subject corresponding to a region including the designated first measurement point has a substantially planar shape. In a case when it is determined that the subject has a substantially planar shape, the geometric transform unit 136 calculates a region satisfying the dimension measurement accuracy when an inclination is corrected through geometric transform. The display control unit 132 performs control for displaying the calculated region in an identifiable manner. In this case, a region corresponding to the entire surface of the planar subject is a region satisfying the dimension measurement accuracy, and is displayed to be equally identifiable over the entire surface of the planar subject.

When detecting that the subject has a planar shape, the image processing device executes straight line detection and vanishing point detection. By using both a detected plane and a plane based on the depth image, the planes are corrected, and a final plane (subject region) is acquired.

In the present embodiment, by performing a geometric transform on an image in which a subject has a substantially planar shape and is imaged in a non-facing manner to a camera, it is possible to convert the image of the subject into an image confronting the face. By performing the geometric transform, a magnification variation due to the inclination is corrected, and the entire subject region having a substantially planar shape in a captured image satisfies the dimension measurement accuracy. The subject region is displayed in an identifiable manner.

According to the above embodiment, when measuring dimensions of a subject in an image, a user can be notified of the subject corresponding to the dimension measurement accuracy, and, thus, a measurement in which dimension measurement accuracy is known becomes possible. By displaying a subject region corresponding to the dimension measurement accuracy in an identifiable manner, more stable and highly accurate dimension measurement can be realized, and a user's convenience can be improved.

According to the image processing device of the present invention, it is possible to provide an image processing device that displays a region in which a distance corresponding to a plurality of measurement points designated in a subject region of an image is measurable on the basis of measurement accuracy.

Other Embodiments

The present invention can also be realized by a process of supplying a program that realizes one or more functions of the above embodiment to a system or a device via a network or a storage medium, and one or more processors in a computer of the system or the device reading and executing the program. The present invention can also be realized by a circuit (for example, an ASIC) that realizes one or more functions.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device comprising:
   at least one processor and/or a circuit configured to function as the following units:
      an acquisition unit configured to acquire an image captured by an imaging element and information related to a distance distribution in a depth direction corresponding to the captured image; and
      a control unit configured to control display of the captured image, wherein the control unit performs control such that a first subject region in the captured image corresponding to a subject within a distance range in which a distance is measurable with a measurement accuracy equal to or greater than a predetermined accuracy and a second subject region in the captured image corresponding to a subject not within the distance range, are displayed so as to be distinguished from each other, from a reference distance in the depth direction set as a distance of a subject at an in-focus position at the time of acquiring the captured image,
   wherein the distance measurement is a distance measurement between subjects corresponding to a plurality of measurement points designated in the captured image, and
   wherein the measurement accuracy is an accuracy of distance measurement between the subjects corresponding to the plurality of measurement points.

2. The image processing device according to claim 1, wherein the distance range is determined according to a measurement accuracy related to a measurement point in the distance measurement or a measurement accuracy related to a distance corresponding to a plurality of measurement points in the distance measurement.

3. The image processing device according to claim 2, wherein the measurement accuracy is a measurement accuracy due to a difference in an imaging magnification, a measurement accuracy due to distortion aberration of an imaging optical system, or a measurement accuracy designated by using operating unit.

4. The image processing device according to claim 1, wherein the distance measurement is performed by using a plurality of measurement points designated in the captured image and the information related to the distance distribution.

5. The image processing device according to claim 1, wherein a distance that is a target of the distance measurement is a distance in a three-dimensional space corresponding to a plurality of measurement points designated in the captured image.

6. The image processing device according to claim 1, wherein the control unit performs control for displaying a distance between a plurality of measurement points in the first subject region.

7. The image processing device according to claim 1, wherein the distance range is a single distance range or a plurality of non-overlapping distance ranges.

8. The image processing device according to claim 1, wherein the control unit performs control for changing one or more of a color, a luminance, and a symbol for the first subject region or the second subject region.

9. The image processing device according to claim 1, wherein the control unit performs control for changing one or more of a color, a luminance, and a symbol for a plurality of the subject regions respectively corresponding to a plurality of the distance ranges.

10. The image processing device according to claim 1, wherein the control unit performs control for detecting an edge of the captured image and changing one or more of a color, a luminance, and a symbol for an edge of the first subject region corresponding to the distance range.

11. The image processing device according to claim 1, wherein the control unit performs control such that a straight line or a curve connecting a plurality of measurement points designated in the captured image is superimposed and displayed on the captured image.

12. The image processing device according to claim 1, wherein, as a measurement point in the distance measurement, a measurement point in the first subject region is able to be designated.

13. The image processing device according to claim 1, wherein the control unit performs control for acquiring the measurement accuracy calculated from a distance resolution and a distance measurement error in the distance measurement and displaying the first subject region in an identifiable manner.

14. The image processing device according to claim 1, wherein the processor further functions as:
   a geometric transform unit configured to correct the image through geometric transform,
   wherein, in a case when it is determined that a subject corresponding to a region including a measurement point designated in the captured image has a planar shape, the geometric transform unit calculates a region satisfying the measurement accuracy, and the control unit performs control for displaying the calculated region in an identifiable manner.

15. An image processing device comprising:
   at least one processor and/or a circuit configured to function as following units:
      an acquisition unit configured to acquire an image captured by an imaging element and information related to a distance distribution in a depth direction corresponding to the captured image; and
      a control unit configured to control display of the captured image, wherein the control unit performs control such that a first subject region in the captured image corresponding to a subject within a distance range in which a distance is measurable with a measurement accuracy equal to or greater than a predetermined accuracy, and a second subject region in the captured image corresponding to a subject not within the distance range, are displayed so as to be distinguished from each other, from a reference distance in the depth direction that corresponds to a point designated by a user in the captured image and that is set as a distance in the information related to the distance distribution, wherein the distance measurement is a distance measurement between subjects corresponding to a plurality of measurement points designated in the captured image, and wherein the measurement accuracy is an accuracy of distance measurement between the subjects corresponding to the plurality of measurement points.

16. The image processing device according to claim 15, wherein the distance range is determined according to a measurement accuracy related to a measurement point in the distance measurement or a measurement accuracy related to a distance corresponding to a plurality of measurement points in the distance measurement.

17. The image processing device according to claim 16, wherein the measurement accuracy is a measurement accuracy due to a difference in an imaging magnification, a measurement accuracy due to distortion aberration of an imaging optical system, or a measurement accuracy designated by using operating unit.

18. The image processing device according to claim 15, wherein the distance measurement is performed by using a plurality of measurement points designated in the captured image and the information related to the distance distribution.

19. The image processing device according to claim 15, wherein a distance that is a target of the distance measurement is a distance in a three-dimensional space corresponding to a plurality of measurement points designated in the captured image.

20. The image processing device according to claim 15, wherein the control unit performs control for displaying a distance between a plurality of measurement points in the first subject region.

21. The image processing device according to claim 15, wherein the distance range is a single distance range or a plurality of non-overlapping distance ranges.

22. The image processing device according to claim 15, wherein the control unit performs control for changing one or more of a color, a luminance, and a symbol for the first subject region or the second subject region.

23. The image processing device according to claim 15, wherein the control unit performs control for changing one or more of a color, a luminance, and a symbol for a plurality of the subject regions respectively corresponding to a plurality of the distance ranges.

24. The image processing device according to claim 15, wherein the control unit performs control for detecting an edge of the captured image and changing one or more of a color, a luminance, and a symbol for an edge of the first subject region corresponding to the distance range.

25. The image processing device according to claim 15, wherein the control unit performs control such that a straight line or a curve connecting a plurality of measurement points designated in the captured image is superimposed and displayed on the captured image.

26. The image processing device according to claim 15, wherein, as a measurement point in the distance measurement, a measurement point in the first subject region is able to be designated.

27. The image processing device according to claim 15, wherein the control unit performs control for acquiring the measurement accuracy calculated from a distance resolution and a distance measurement error in the distance measurement and displaying the first subject region in an identifiable manner.

28. The image processing device according to claim 15, wherein the processor further functions as:

a geometric transform unit configured to correct the image through geometric transform, wherein, in a case when it is determined that a subject corresponding to a region including a measurement point designated in the captured image has a planar shape, the geometric transform unit calculates a region satisfying the measurement accuracy, and the control unit performs control for displaying the calculated region in an identifiable manner.

29. An imaging device comprising:

an imaging sensor; and at least one processor and/or a circuit configured to function as following units:

an acquisition unit configured to acquire an image captured by an imaging element and information related to a distance distribution in a depth direction corresponding to the captured image; and a control unit configured to control display of the captured image, wherein the control unit performs control such that a first subject region in the captured image corresponding to a subject within a distance range in which a distance is measurable with measurement accuracy equal to or higher than a predetermined accuracy, and a second subject region in the captured image corresponding to a subject not within the distance range, are displayed so as to be distinguished from each other, from a reference distance in the depth direction set as a distance of a subject at an in-focus position at the time of acquiring the captured image, wherein the distance measurement is a distance measurement between subjects corresponding to a plurality of measurement points designated in the captured image, and wherein the measurement accuracy is an accuracy of distance measurement between the subjects corresponding to the plurality of measurement points.

30. The imaging device according to claim 29, wherein the imaging element has a plurality of microlenses and a plurality of photoelectric conversion portions respectively corresponding to the microlenses, and the information related to the distance distribution is acquired from a plurality of image signals having different viewpoints output by the plurality of photoelectric conversion portions.

31. The imaging device according to claim 29, wherein the control unit calculates a distance between a plurality of measurement points designated in the captured image, calculates an imaging magnification from a distance from the imaging device to the subject and a focal length of an imaging optical system, and converts the distance between the plurality of measurement points into a distance on an object side by using a pixel size of the imaging device and the imaging magnification.

32. The imaging device according to claim 31, further comprising:

a display unit configured to display the distance between the plurality of measurement points designated in the captured image.

33. An imaging device comprising:
an imaging sensor; and
at least one processor and/or a circuit configured to function as following units:
an acquisition unit configured to acquire an image captured by an imaging element and information related to a distance distribution in a depth direction corresponding to the captured image; and
a control unit configured to control display of the captured image, wherein the control unit performs control such that a first subject region in the captured image corresponding to a subject within a distance range in which a distance is measurable with measurement accuracy equal to or higher than a predetermined accuracy, and a second subject region in the captured image corresponding to a subject not within the distance range are displayed so as to be distinguished from each other, from a reference distance in the depth direction that corresponds to a point designated by a user in the captured image and that is set as a distance in the information related to the distance distribution,
wherein the distance measurement is a distance measurement between subjects corresponding to a plurality of measurement points designated in the captured image, and
wherein the measurement accuracy is an accuracy of distance measurement between the subjects corresponding to the plurality of measurement points.

34. The imaging device according to claim 33, wherein the imaging element has a plurality of microlenses and a plurality of photoelectric conversion portions respectively corresponding to the microlenses, and the information related to the distance distribution is acquired from a plurality of image signals having different viewpoints output by the plurality of photoelectric conversion portions.

35. The imaging device according to claim 33, wherein the control unit calculates a distance between a plurality of measurement points designated in the captured image, calculates an imaging magnification from a distance from the imaging device to the subject and a focal length of an imaging optical system, and converts the distance between the plurality of measurement points into a distance on an object side by using a pixel size of the imaging device and the imaging magnification.

36. The imaging device according to claim 35, further comprising:
a display unit configured to display the distance between the plurality of measurement points designated in the captured image.

37. An image processing method executed by an image processing device, the image processing method comprising:
acquiring an image captured by an imaging element and information related to a distance distribution in a depth direction corresponding to the captured image; and
controlling display of the captured image, wherein, in the controlling, control is performed such that a first subject region in the captured image corresponding to a subject within a distance range in which a distance is measurable with a measurement accuracy equal to or greater than a reference predetermined accuracy, and a second subject region in the captured image corresponding to a subject not within the distance range, are displayed so as to be distinguished from each other, from a reference distance in the depth direction set as a distance of a subject at an in-focus position at the time of acquiring the captured image,
wherein the distance measurement is a distance measurement between subjects corresponding to a plurality of measurement points designated in the captured image, and
wherein the measurement accuracy is an accuracy of distance measurement between the subjects corresponding to the plurality of measurement points.

38. An image processing method executed by an image processing device, the image processing method comprising:
acquiring an image captured by an imaging element and information related to a distance distribution in a depth direction corresponding to the captured image; and
controlling display of the captured image, wherein, in the controlling, control is performed such that a first subject region in the captured image corresponding to a subject within a distance range in which a distance is measurable with a measurement accuracy equal to or greater than a predetermined accuracy, and a second subject region in the captured image corresponding to a subject not within the distance range, are displayed so as to be distinguished from each other, from a reference distance in the depth direction that corresponds to a point designated by a user in the captured image and that is set as a distance in the information related to the distance distribution,
wherein the distance measurement is a distance measurement between subjects corresponding to a plurality of measurement points designated in the captured image, and
wherein the measurement accuracy is an accuracy of distance measurement between the subjects corresponding to the plurality of measurement points.

39. A non-transitory storage medium on which a computer program for causing a computer of an image processing device to execute an image processing method is stored, the method comprising:
acquiring an image captured by an imaging element and information related to a distance distribution in a depth direction corresponding to the captured image; and
controlling display of the captured image, wherein, in the controlling, control is performed such that a subject region in the image corresponding to a subject within a distance range in which a distance is measurable with measurement accuracy equal to or higher than a predetermined accuracy, and a second subject region in the captured image corresponding to a subject not within the distance range, are displayed so as to be distinguished from each other, from a reference distance in the depth direction set as a distance of a subject at an in-focus position at the time of acquiring the captured image,
wherein the distance measurement is a distance measurement between subjects corresponding to a plurality of measurement points designated in the captured image, and
wherein the measurement accuracy is an accuracy of distance measurement between the subjects corresponding to the plurality of measurement points.

40. A non-transitory storage medium on which a computer program for causing a computer of an image processing device to execute an image processing method is stored, the method comprising:

acquiring an image captured by an imaging element and information related to a distance distribution in a depth direction corresponding to the captured image; and controlling display of the captured image, wherein, in the controlling, control is performed such that a first subject region in the captured image corresponding to a subject within a distance range in which a distance is measurable with measurement accuracy equal to or higher than a predetermined accuracy, and a second subject region in the captured image corresponding to a subject not within the distance range, are displayed so as to be distinguished from each other, from a reference distance in the depth direction that corresponds to a point designated by a user in the captured image and that is set as a distance in the information related to the distance distribution, wherein the distance measurement is a distance measurement between subjects corresponding to a plurality of measurement points designated in the captured image, and wherein the measurement accuracy is an accuracy of distance measurement between the subjects corresponding to the plurality of measurement points.

* * * * *